US012706966B2

(12) United States Patent
Wang

(10) Patent No.: US 12,706,966 B2
(45) Date of Patent: Aug. 11, 2026

(54) METHOD, APPARATUS, AND MEDIUM FOR VIDEO PROCESSING

(71) Applicant: Bytedance Inc., Los Angeles, CA (US)

(72) Inventor: Ye-Kui Wang, Los Angeles, CA (US)

(73) Assignee: BYTEDANCE INC., Los Angeles, CA (US)

( * ) Notice: Subject to any disclaimer, the term of this patent is extended or adjusted under 35 U.S.C. 154(b) by 39 days.

(21) Appl. No.: 18/623,720

(22) Filed: Apr. 1, 2024

(65) Prior Publication Data

US 2024/0251005 A1 Jul. 25, 2024

Related U.S. Application Data

(63) Continuation of application No. PCT/US2022/077305, filed on Sep. 29, 2022.

(60) Provisional application No. 63/251,336, filed on Oct. 1, 2021.

(51) Int. Cl.

| | |
|---|---|
| ***H04L 65/65*** | (2022.01) |
| ***G06F 16/783*** | (2019.01) |
| ***H04N 21/84*** | (2011.01) |
| ***H04N 21/845*** | (2011.01) |

(52) U.S. Cl.

CPC ............ *H04L 65/65* (2022.05); *G06F 16/783* (2019.01); *H04N 21/84* (2013.01); *H04N 21/845* (2013.01)

(58) Field of Classification Search

CPC ..... H04L 65/65; H04L 65/612; G06F 16/783; H04N 21/84; H04N 21/845; H04N 21/8456; H04N 19/46; H04N 19/61; H04N 21/235; H04N 21/435; H04N 21/8455; H04N 21/2353; H04N 21/8405

USPC ........................................................ 709/231

See application file for complete search history.

(56) References Cited

U.S. PATENT DOCUMENTS

| | | | |
|---|---|---|---|
| 9,338,209 B1 | 5/2016 | Begen et al. | |
| 2003/0236912 A1 | 12/2003 | Klemets et al. | |
| 2007/0110074 A1 | 5/2007 | Bradley et al. | |
| 2011/0307581 A1 | 12/2011 | Furbeck et al. | |
| 2012/0203867 A1 | 8/2012 | Furbeck | |
| 2012/0290644 A1 | 11/2012 | Gabin et al. | |
| 2014/0013003 A1 | 1/2014 | Giladi | |
| 2016/0029091 A1 | 1/2016 | Le Floch et al. | |
| 2017/0156015 A1 | 6/2017 | Stockhammer | |
| 2018/0007395 A1 | 1/2018 | Ugur et al. | |
| 2018/0109743 A1* | 4/2018 | Oh | H04N 25/57 |
| 2019/0037283 A1 | 1/2019 | Krauss et al. | |

(Continued)

FOREIGN PATENT DOCUMENTS

| | | |
|---|---|---|
| JP | 2022-170709 A | 11/2022 |
| WO | 2017/199743 A1 | 11/2017 |

OTHER PUBLICATIONS

International Search Report in PCT/US2022/077305, mailed Jan. 17, 2023, 3 pages.

(Continued)

*Primary Examiner* — Adil Ocak

(74) *Attorney, Agent, or Firm* — Astute IP Law Group

(57) ABSTRACT

Embodiments of the present disclosure provide a solution for video processing. A method for video processing is proposed. The method comprises: receiving, at a first device, a metadata file from a second device; and determining a descriptor in a data set in the metadata file, a presence of the descriptor indicating that a representation in the data set is an external stream representation (ESR).

18 Claims, 14 Drawing Sheets

(56) References Cited

U.S. PATENT DOCUMENTS

| | | | | |
|---|---|---|---|---|
| 2019/0124173 | A1 | 4/2019 | Thang et al. | |
| 2019/0394537 | A1 | 12/2019 | Chen et al. | |
| 2020/0177929 | A1 | 6/2020 | Wee et al. | |
| 2020/0358838 | A1 * | 11/2020 | Wang | H04N 21/8456 |
| 2021/0099508 | A1 * | 4/2021 | Sodagar | H04N 21/435 |
| 2021/0185411 | A1 * | 6/2021 | Denoual | H04N 21/4621 |
| 2023/0164371 | A1 | 5/2023 | Denoual et al. | |

OTHER PUBLICATIONS

International Search Report in PCT/US2022/077299, mailed Dec. 8, 2022, 3 pages.

Office Action received for Japanese Patent Application No. 2024-519951, mailed on Apr. 1, 2025, 12 pages (6 pages of English Translation and 6 pages of Original Document).

Office Action received for Japanese Patent Application No. 2024-519960, mailed on Apr. 1, 2025, 9 pages (4 pages of English Translation and 5 pages of Original Document).

Sodagar, Iraj, "Technologies under Consideration for Dynamic Adaptive Streaming over HTTP 23009, Parts 1, 3, 4, 5, 6 and 8", ISO/IEC JTC 1/SC 29/WG 03 MPEG, Systems N0333, Available online at <https://www.mpeg.org/wp-content/uploads/mpeg_meetings/135_OnLine/w20587.zip>, Jul. 23, 2021, 113 pages.

Extended European Search Report for European Patent Application No. 22877589.6, mailed on May 8, 2025, 12 pages.

Extended European Search Report for European Patent Application No. 22877594.6, mailed on May 9, 2025, 11 pages.

Garrison, Ron, "Structure of a MPEG-DASH MPD", OTT Verse, Available online at: <https://ottverse.com/structure-of-an-mpeg-dash-mpd/>, Apr. 1, 2021, 16 pages.

Non-Final Office Action for U.S. Appl. No. 18/623,742, mailed on May 30, 2025, 13 pages.

Wang et al., "DASH support of external decoding refresh (EDR) for VVC", 127. MPEG Meeting, Gothenburg, Motion Picture Expert Group or ISO/IEC JTC1/SC29/WG11, No. m48081, XP030206911, Retrieved from the Internet: URL:http://phenix.int-evry.fr/mpeg/doc_end_user/documents/127_Gothenburg/wg11/m48081-v2-m48081-v2-ErdDash.zip [retrieved on May 20, 2019], *Sections 5.3.3.1, 5.3.3.2 & 5.3.5.1; table 5 *, * Section 4.1; figure 1 *, May 20, 2019, 224 pages.

Wang et al., "[30.3][DASH] External Stream Representation (ESR) for support of EDRAP based video streaming", Bytedance Inc., Zhejiang University, 135. MPEG Meeting, Motion Picture Expert Group or ISO/IEC JTC1/SC29/WG3, No. m57430, XP030297072, Jul. 5, 2021, 6 pages.

* cited by examiner

METHOD, APPARATUS, AND MEDIUM FOR VIDEO PROCESSING

CROSS REFERENCE TO RELATED APPLICATIONS

This application is a continuation of International Application No. PCT/US2022/077305, filed on Sep. 29, 2022, which claims the benefit of the U.S. Provisional Application No. 63/251,336, filed Oct. 1, 2021. The entire contents of these applications are hereby incorporated by reference in their entireties.

FIELD

Embodiments of the present disclosure relates generally to video coding techniques, and more particularly, to an external stream representation descriptor.

BACKGROUND

Media streaming applications are typically based on the internet protocol (IP), transmission control protocol (TCP), and hypertext transfer protocol (HTTP) transport methods, and typically rely on a file format such as the ISO base media file format (ISOBMFF). One such streaming system is dynamic adaptive streaming over HTTP (DASH). In DASH, there may be multiple representations for video and/or audio data of multimedia content, different representations may correspond to different coding characteristics (e.g., different profiles or levels of a video coding standard, different bitrates, different spatial resolutions, etc.). Moreover, extended dependent random access point (EDRAP) pictures based video coding and streaming are proposed. Therefore, it is worth studying on a mechanism for identifying an external stream representation.

SUMMARY

Embodiments of the present disclosure provide a solution for video processing.

In a first aspect, a method for video processing is proposed. The method comprises: receiving, at a first device, a metadata file from a second device; and determining a descriptor in a data set in the metadata file, a presence of the descriptor indicating that a representation in the data set is an external stream representation (ESR).

Based on the method in accordance with the first aspect of the present disclosure, a descriptor is employed to identify an ESR. Compared with the conventional solution where an attribute is utilized to identify an ESR, the proposed method can advantageously identify the ESR more efficiently.

In a second aspect, another method for video processing is proposed. The method comprises: determining, at a second device, a descriptor in a data set in a metadata file, a presence of the descriptor indicating that a representation in the data set is an ESR; and transmitting the metadata file to a first device.

Based on the method in accordance with the second aspect of the present disclosure, a descriptor is employed to identify an ESR. Compared with the conventional solution where an attribute is utilized to identify an ESR, the proposed method can advantageously identify the ESR more efficiently.

In a third aspect, an apparatus for processing video data is proposed. The apparatus for processing video data comprises a processor and a non-transitory memory with instructions thereon. The instructions, upon execution by the processor, cause the processor to perform a method in accordance with the first or second aspect of the present disclosure.

In a fourth aspect, a non-transitory computer-readable storage medium is proposed. The non-transitory computer-readable storage medium stores instructions that cause a processor to perform a method in accordance with the first or second aspect of the present disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the following detailed description with reference to the accompanying drawings, the above and other objectives, features, and advantages of example embodiments of the present disclosure will become more apparent. In the example embodiments of the present disclosure, the same reference numerals usually refer to the same components.

Throughout the drawings, the same or similar reference numerals usually refer to the same or similar elements.

DETAILED DESCRIPTION

Principle of the present disclosure will now be described with reference to some embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Example Environment

Figure 1:
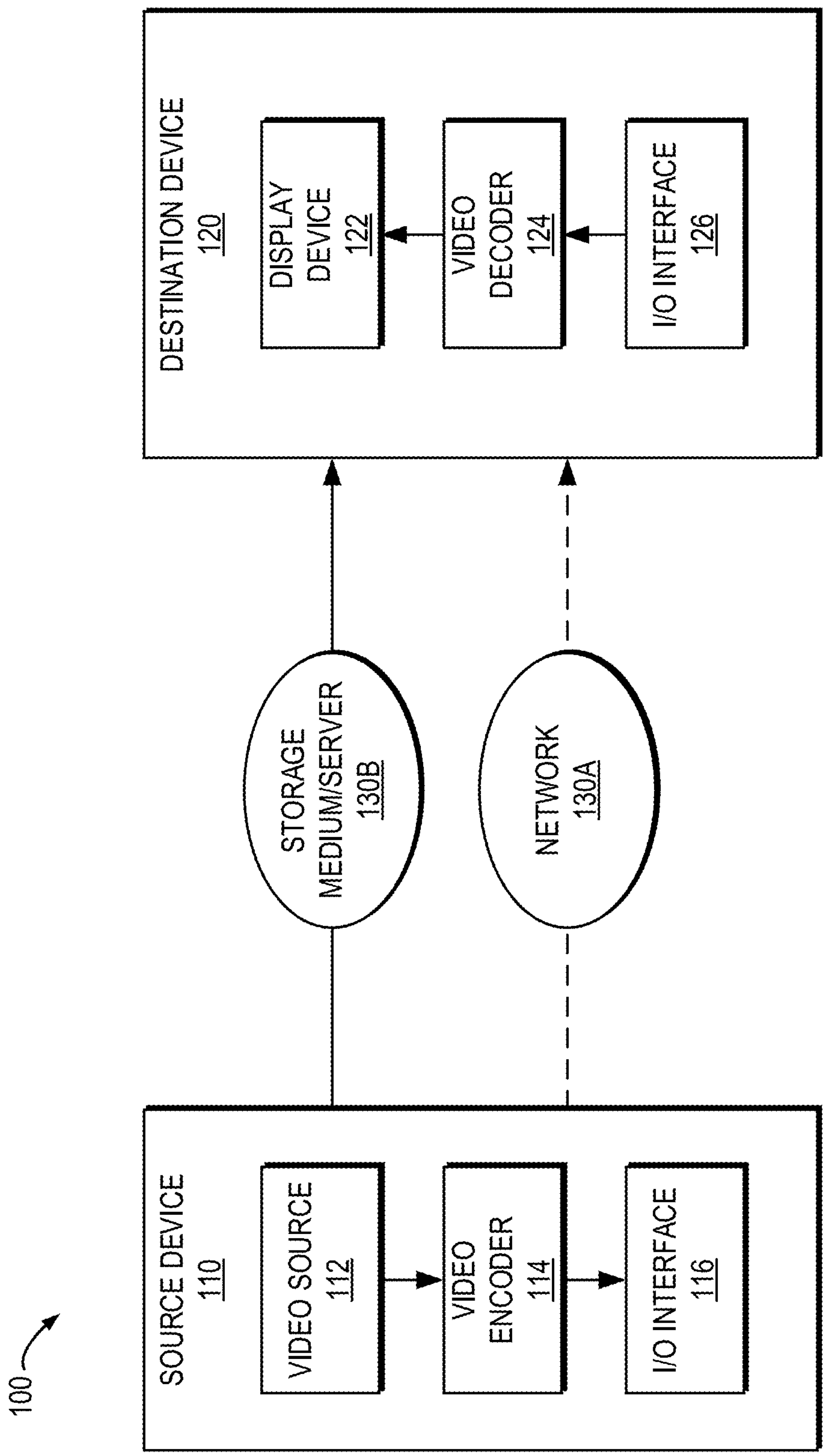
FIG. 1 illustrates a block diagram of an example video coding system in accordance with some embodiments of the present disclosure.

FIG. 1 is a block diagram that illustrates an example video coding system 100 that may utilize the techniques of this disclosure. As shown, the video coding system 100 may include a source device 110 and a destination device 120. The source device 110 can be also referred to as a video encoding device, and the destination device 120 can be also referred to as a video decoding device. In operation, the source device 110 can be configured to generate encoded video data and the destination device 120 can be configured to decode the encoded video data generated by the source device 110. The source device 110 may include a video source 112, a video encoder 114, and an input/output (I/O) interface 116.

The video source 112 may include a source such as a video capture device. Examples of the video capture device include, but are not limited to, an interface to receive video data from a video content provider, a computer graphics system for generating video data, and/or a combination thereof.

The video data may comprise one or more pictures. The video encoder 114 encodes the video data from the video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. The I/O interface 116 may include a modulator/demodulator and/or a transmitter. The encoded video data may be transmitted directly to destination device 120 via the I/O interface 116 through the network 130A. The encoded video data may also be stored onto a storage medium/server 130B for access by destination device 120.

The destination device 120 may include an I/O interface 126, a video decoder 124, and a display device 122. The I/O interface 126 may include a receiver and/or a modem. The I/O interface 126 may acquire encoded video data from the source device 110 or the storage medium/server 130B. The video decoder 124 may decode the encoded video data. The display device 122 may display the decoded video data to a user. The display device 122 may be integrated with the destination device 120, or may be external to the destination device 120 which is configured to interface with an external display device.

The video encoder 114 and the video decoder 124 may operate according to a video compression standard, such as the High Efficiency Video Coding (HEVC) standard, Versatile Video Coding (VVC) standard and other current and/or further standards.

Figure 2:
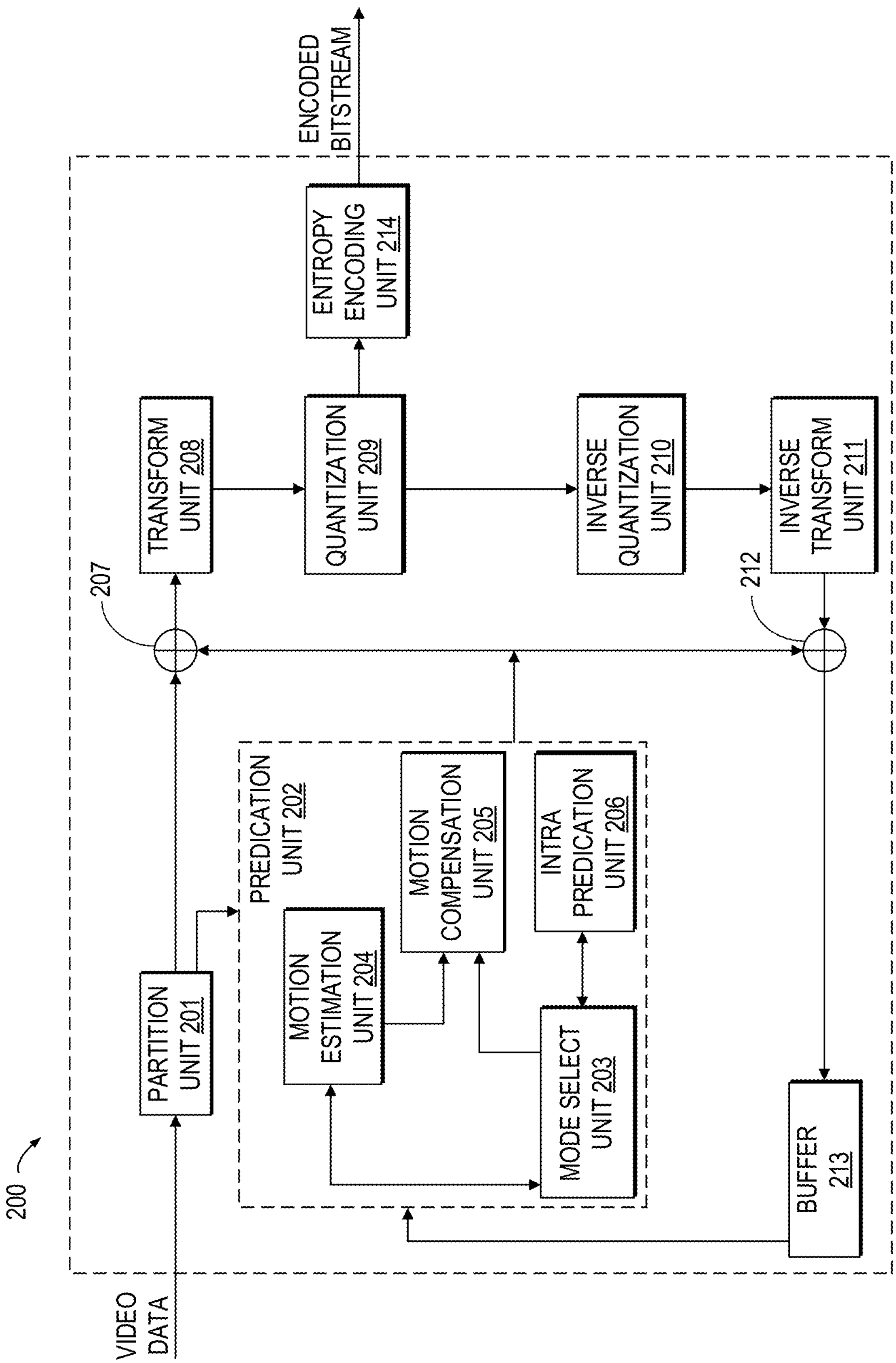
FIG. 2 illustrates a block diagram of an example video encoder in accordance with some embodiments of the present disclosure.

FIG. 2 is a block diagram illustrating an example of a video encoder 200, which may be an example of the video encoder 114 in the system 100 illustrated in FIG. 1, in accordance with some embodiments of the present disclosure.

The video encoder 200 may be configured to implement any or all of the techniques of this disclosure. In the example of FIG. 2, the video encoder 200 includes a plurality of functional components. The techniques described in this disclosure may be shared among the various components of the video encoder 200. In some examples, a processor may be configured to perform any or all of the techniques described in this disclosure.

In some embodiments, the video encoder 200 may include a partition unit 201, a predication unit 202 which may include a mode select unit 203, a motion estimation unit 204, a motion compensation unit 205 and an intra-prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, the video encoder 200 may include more, fewer, or different functional components. In an example, the predication unit 202 may include an intra block copy (IBC) unit. The IBC unit may perform predication in an IBC mode in which at least one reference picture is a picture where the current video block is located.

Furthermore, although some components, such as the motion estimation unit 204 and the motion compensation unit 205, may be integrated, but are represented in the example of FIG. 2 separately for purposes of explanation.

The partition unit 201 may partition a picture into one or more video blocks. The video encoder 200 and the video decoder 300 may support various video block sizes.

The mode select unit 203 may select one of the coding modes, intra or inter, e.g., based on error results, and provide the resulting intra-coded or inter-coded block to a residual generation unit 207 to generate residual block data and to a reconstruction unit 212 to reconstruct the encoded block for use as a reference picture. In some examples, the mode select unit 203 may select a combination of intra and inter predication (CIIP) mode in which the predication is based on an inter predication signal and an intra predication signal. The mode select unit 203 may also select a resolution for a motion vector (e.g., a sub-pixel or integer pixel precision) for the block in the case of inter-predication.

To perform inter prediction on a current video block, the motion estimation unit 204 may generate motion information for the current video block by comparing one or more reference frames from buffer 213 to the current video block. The motion compensation unit 205 may determine a predicted video block for the current video block based on the motion information and decoded samples of pictures from the buffer 213 other than the picture associated with the current video block.

The motion estimation unit 204 and the motion compensation unit 205 may perform different operations for a current video block, for example, depending on whether the current video block is in an I-slice, a P-slice, or a B-slice. As used herein, an "I-slice" may refer to a portion of a picture composed of macroblocks, all of which are based upon macroblocks within the same picture. Further, as used herein, in some aspects, "P-slices" and "B-slices" may refer to portions of a picture composed of macroblocks that are not dependent on macroblocks in the same picture.

In some examples, the motion estimation unit 204 may perform uni-directional prediction for the current video block, and the motion estimation unit 204 may search reference pictures of list 0 or list 1 for a reference video block for the current video block. The motion estimation unit 204 may then generate a reference index that indicates the reference picture in list 0 or list 1 that contains the reference video block and a motion vector that indicates a spatial displacement between the current video block and the reference video block. The motion estimation unit 204 may output the reference index, a prediction direction indicator, and the motion vector as the motion information of the current video block. The motion compensation unit 205 may generate the predicted video block of the current video block based on the reference video block indicated by the motion information of the current video block.

Alternatively, in other examples, the motion estimation unit 204 may perform bi-directional prediction for the current video block. The motion estimation unit 204 may search the reference pictures in list 0 for a reference video block for the current video block and may also search the reference pictures in list 1 for another reference video block for the current video block. The motion estimation unit 204 may then generate reference indexes that indicate the reference pictures in list 0 and list 1 containing the reference video blocks and motion vectors that indicate spatial displacements between the reference video blocks and the current video block. The motion estimation unit 204 may output the reference indexes and the motion vectors of the current video block as the motion information of the current video block. The motion compensation unit 205 may generate the predicted video block of the current video block based on the reference video blocks indicated by the motion information of the current video block.

In some examples, the motion estimation unit 204 may output a full set of motion information for decoding processing of a decoder. Alternatively, in some embodiments, the motion estimation unit 204 may signal the motion information of the current video block with reference to the motion information of another video block. For example, the motion estimation unit 204 may determine that the motion information of the current video block is sufficiently similar to the motion information of a neighboring video block.

In one example, the motion estimation unit 204 may indicate, in a syntax structure associated with the current video block, a value that indicates to the video decoder 300 that the current video block has the same motion information as the another video block.

In another example, the motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

The intra prediction unit 206 may perform intra prediction on the current video block. When the intra prediction unit 206 performs intra prediction on the current video block, the intra prediction unit 206 may generate prediction data for the current video block based on decoded samples of other video blocks in the same picture. The prediction data for the current video block may include a predicted video block and various syntax elements.

The residual generation unit 207 may generate residual data for the current video block by subtracting (e.g., indicated by the minus sign) the predicted video block (s) of the current video block from the current video block. The residual data of the current video block may include residual video blocks that correspond to different sample components of the samples in the current video block.

In other examples, there may be no residual data for the current video block for the current video block, for example in a skip mode, and the residual generation unit 207 may not perform the subtracting operation.

The transform processing unit 208 may generate one or more transform coefficient video blocks for the current video block by applying one or more transforms to a residual video block associated with the current video block.

After the transform processing unit 208 generates a transform coefficient video block associated with the current video block, the quantization unit 209 may quantize the transform coefficient video block associated with the current video block based on one or more quantization parameter (QP) values associated with the current video block.

The inverse quantization unit 210 and the inverse transform unit 211 may apply inverse quantization and inverse transforms to the transform coefficient video block, respectively, to reconstruct a residual video block from the transform coefficient video block. The reconstruction unit 212 may add the reconstructed residual video block to corresponding samples from one or more predicted video blocks generated by the predication unit 202 to produce a reconstructed video block associated with the current video block for storage in the buffer 213.

After the reconstruction unit 212 reconstructs the video block, loop filtering operation may be performed to reduce video blocking artifacts in the video block.

The entropy encoding unit 214 may receive data from other functional components of the video encoder 200. When the entropy encoding unit 214 receives the data, the entropy encoding unit 214 may perform one or more entropy encoding operations to generate entropy encoded data and output a bitstream that includes the entropy encoded data.

Figure 3:
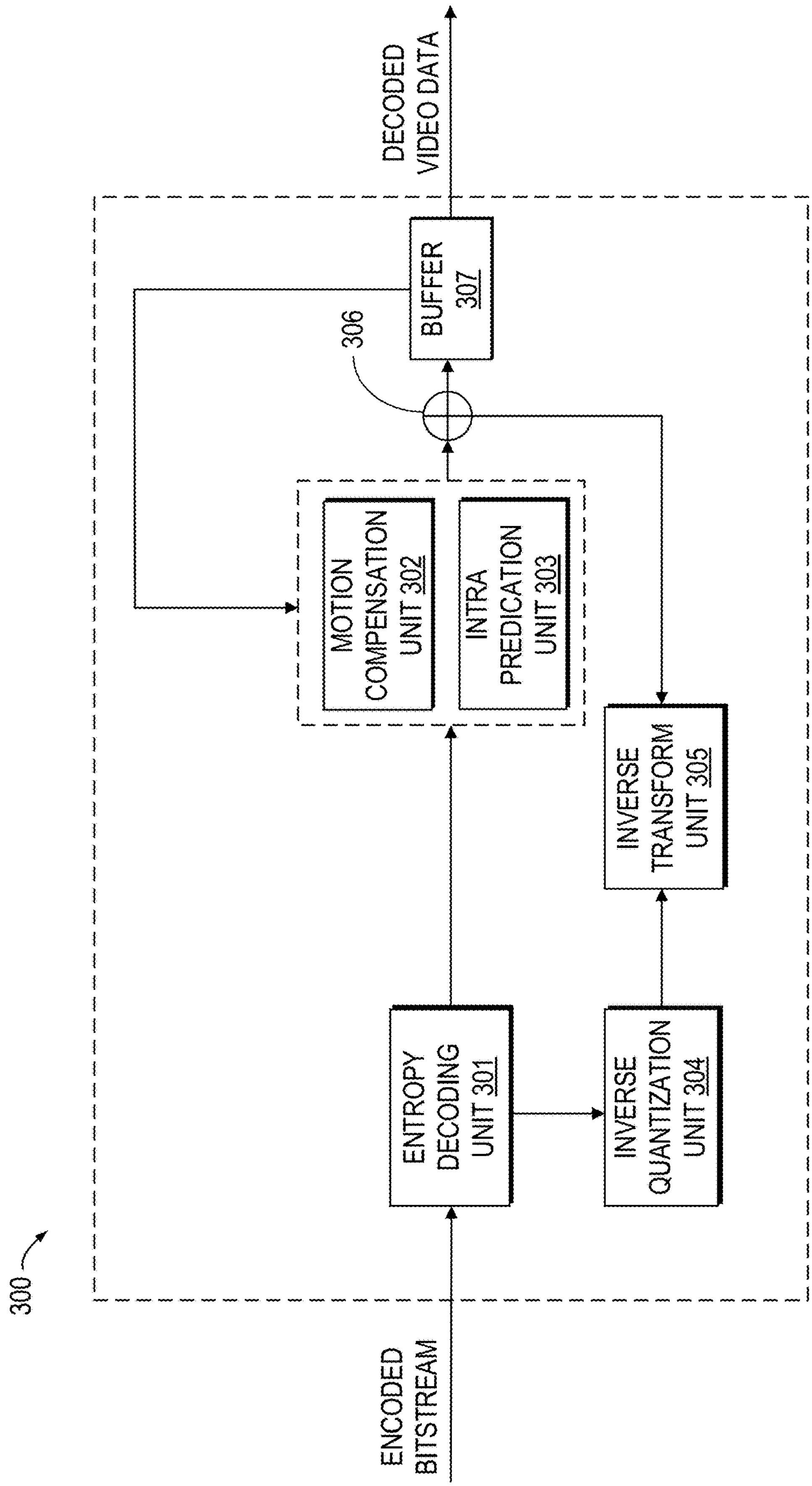
FIG. 3 illustrates a block diagram of an example video decoder in accordance with some embodiments of the present disclosure.

FIG. 3 is a block diagram illustrating an example of a video decoder 300, which may be an example of the video decoder 124 in the system 100 illustrated in FIG. 1, in accordance with some embodiments of the present disclosure.

The video decoder 300 may be configured to perform any or all of the techniques of this disclosure. In the example of FIG. 3, the video decoder 300 includes a plurality of functional components. The techniques described in this disclosure may be shared among the various components of the video decoder 300. In some examples, a processor may be configured to perform any or all of the techniques described in this disclosure.

In the example of FIG. 3, the video decoder 300 includes an entropy decoding unit 301, a motion compensation unit 302, an intra prediction unit 303, an inverse quantization unit 304, an inverse transformation unit 305, and a reconstruction unit 306 and a buffer 307. The video decoder 300 may, in some examples, perform a decoding pass generally reciprocal to the encoding pass described with respect to video encoder 200.

The entropy decoding unit 301 may retrieve an encoded bitstream. The encoded bitstream may include entropy coded video data (e.g., encoded blocks of video data). The entropy decoding unit 301 may decode the entropy coded video data, and from the entropy decoded video data, the motion compensation unit 302 may determine motion information including motion vectors, motion vector precision, reference picture list indexes, and other motion information. The motion compensation unit 302 may, for example, determine such information by performing the AMVP and merge mode. AMVP is used, including derivation of several most probable candidates based on data from adjacent PBs and the reference picture. Motion information typically includes the horizontal and vertical motion vector displacement values, one or two reference picture indices, and, in the case of prediction regions in B slices, an identification of which reference picture list is associated with each index. As used herein, in some aspects, a "merge mode" may refer to deriving the motion information from spatially or temporally neighboring blocks.

The motion compensation unit 302 may produce motion compensated blocks, possibly performing interpolation based on interpolation filters. Identifiers for interpolation filters to be used with sub-pixel precision may be included in the syntax elements.

The motion compensation unit 302 may use the interpolation filters as used by the video encoder 200 during encoding of the video block to calculate interpolated values for sub-integer pixels of a reference block. The motion compensation unit 302 may determine the interpolation filters used by the video encoder 200 according to the received syntax information and use the interpolation filters to produce predictive blocks.

The motion compensation unit 302 may use at least part of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence. As used herein, in some aspects, a "slice" may refer to a data structure that can be decoded independently from other slices of the same picture, in terms of entropy coding, signal prediction, and residual signal reconstruction. A slice can either be an entire picture or a region of a picture.

The intra prediction unit 303 may use intra prediction modes for example received in the bitstream to form a prediction block from spatially adjacent blocks. The inverse quantization unit 304 inverse quantizes, i.e., de-quantizes, the quantized video block coefficients provided in the bitstream and decoded by entropy decoding unit 301. The inverse transform unit 305 applies an inverse transform.

The reconstruction unit 306 may obtain the decoded blocks, e.g., by summing the residual blocks with the corresponding prediction blocks generated by the motion compensation unit 302 or intra-prediction unit 303. If desired, a deblocking filter may also be applied to filter the decoded blocks in order to remove blockiness artifacts. The decoded video blocks are then stored in the buffer 307, which provides reference blocks for subsequent motion compensation/intra predication and also produces decoded video for presentation on a display device.

Some exemplary embodiments of the present disclosure will be described in detailed hereinafter. It should be understood that section headings are used in the present document to facilitate case of understanding and do not limit the embodiments disclosed in a section to only that section. Furthermore, while certain embodiments are described with reference to Versatile Video Coding or other specific video codecs, the disclosed techniques are applicable to other video coding technologies also. Furthermore, while some embodiments describe video coding steps in detail, it will be understood that corresponding steps decoding that undo the coding will be implemented by a decoder. Furthermore, the term video processing encompasses video coding or compression, video decoding or decompression and video transcoding in which video pixels are represented from one compressed format into another compressed format or at a different compressed bitrate.

1. Summary

This disclosure is related to video streaming. Specifically, it is related to the design of main stream representation descriptor and external stream representation descriptor for extended dependent random access point (EDRAP) based video streaming, and the signalling of stream access points (SAPs) in a main stream representation. The ideas may be applied individually or in various combinations, for media streaming systems, e.g., based on the Dynamic Adaptive Streaming over HTTP (DASH) standard or its extensions.

2. Background

2.1. Video Coding Standards

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, the Joint Video Exploration Team (JVET) was founded by VCEG and MPEG jointly in 2015. Since then, many new methods have been adopted by JVET and put into the reference software named Joint Exploration Model (JEM). The JVET was later renamed to be the Joint Video Experts Team (JVET) when the Versatile Video Coding (VVC) project officially started. VVC is the new coding standard, targeting at 50% bitrate reduction as compared to HEVC, that has been finalized by the JVET at its 19th meeting ended on Jul. 1, 2020.

The Versatile Video Coding (VVC) standard (ITU-T H.266|ISO/IEC 23090-3) and the associated Versatile Supplemental Enhancement Information (VSEI) standard (ITU-T H.274|ISO/IEC 23002-7) have been designed for use in a maximally broad range of applications, including both the traditional uses such as television broadcast, video conferencing, or playback from storage media, and also newer and more advanced use cases such as adaptive bit rate streaming, video region extraction, composition and merging of content from multiple coded video bitstreams, multiview video, scalable layered coding, and viewport-adaptive 360° immersive media.

The Essential Video Coding (EVC) standard (ISO/IEC 23094-1) is another video coding standard that has recently been developed by MPEG.

2.2. File Format Standards

Media streaming applications are typically based on the IP, TCP, and HTTP transport methods, and typically rely on a file format such as the ISO base media file format (ISOBMFF). One such streaming system is dynamic adaptive streaming over HTTP (DASH). For using a video format with ISOBMFF and DASH, a file format specification specific to the video format, such as the AVC file format and the HEVC file format, would be needed for encapsulation of the video content in ISOBMFF tracks and in DASH representations and segments. Important information about the video bitstreams, e.g., the profile, tier, and level, and many others, would need to be exposed as file format level metadata and/or DASH media presentation description (MPD) for content selection purposes, e.g., for selection of appropriate media segments both for initialization at the beginning of a streaming session and for stream adaptation during the streaming session.

Similarly, for using an image format with ISOBMFF, a file format specification specific to the image format, such as the AVC image file format and the HEVC image file format, would be needed.

The VVC video file format, the file format for storage of VVC video content based on ISOBMFF, is currently being developed by MPEG.

The VVC image file format, the file format for storage of image content coded using VVC, based on ISOBMFF, is currently being developed by MPEG.

2.3. DASH

In Dynamic adaptive streaming over HTTP (DASH), there may be multiple representations for video and/or audio data of multimedia content, different representations may correspond to different coding characteristics (e.g., different profiles or levels of a video coding standard, different bitrates, different spatial resolutions, etc.). The manifest of such representations may be defined in a Media Presentation Description (MPD) data structure. A media presentation may correspond to a structured collection of data that is accessible to DASH streaming client device. The DASH streaming client device may request and download media data information to present a streaming service to a user of the client device. A media presentation may be described in the MPD data structure, which may include updates of the MPD.

A media presentation may contain a sequence of one or more periods. Each period may extend until the start of the next Period, or until the end of the media presentation, in the case of the last period. Each period may contain one or more representations for the same media content. A representation may be one of a number of alternative encoded versions of audio, video, timed text, or other such data. The representations may differ by encoding types, e.g., by bitrate, resolution, and/or codec for video data and bitrate, language, and/or codec for audio data. The term representation may be used to refer to a section of encoded audio or video data corresponding to a particular period of the multimedia content and encoded in a particular way.

Representations of a particular period may be assigned to a group indicated by an attribute in the MPD indicative of an adaptation set to which the representations belong. Representations in the same adaptation set are generally considered alternatives to each other, in that a client device can dynamically and seamlessly switch between these representations, e.g., to perform bandwidth adaptation. For example, each representation of video data for a particular period may be assigned to the same adaptation set, such that any of the representations may be selected for decoding to present media data, such as video data or audio data, of the multimedia content for the corresponding period. The media content within one period may be represented by either one representation from group 0, if present, or the combination of at most one representation from each non-zero group, in some examples. Timing data for each representation of a period may be expressed relative to the start time of the period. A representation may include one or more segments. Each representation may include an initialization segment, or each segment of a representation may be self-initializing. When present, the initialization segment may contain initialization information for accessing the representation. In general, the initialization segment does not contain media data. A segment may be uniquely referenced by an identifier, such as a uniform resource locator (URL), uniform resource name (URN), or uniform resource identifier (URI). The MPD may provide the identifiers for each segment. In some examples, the MPD may also provide byte ranges in the form of a range attribute, which may correspond to the data for a segment within a file accessible by the URL, URN, or URI.

Different representations may be selected for substantially simultaneous retrieval for different types of media data. For example, a client device may select an audio representation, a video representation, and a timed text representation from which to retrieve segments. In some examples, the client device may select particular adaptation sets for performing bandwidth adaptation. That is, the client device may select an adaptation set including video representations, an adaptation set including audio representations, and/or an adaptation set including timed text. Alternatively, the client device may select adaptation sets for certain types of media (e.g., video), and directly select representations for other types of media (e.g., audio and/or timed text).

A typical DASH streaming procedure is shown by the following steps:

1) The client gets the MPD.
2) The client estimates the downlink bandwidth, and selects a video representation and an audio representation according to the estimated downlink bandwidth and the codec, decoding capability, display size, audio language setting, etc.
3) Unless the end of the media presentation is reached, the client requests media segments of the selected representations and presents the streaming content to the user.
4) The client keeps estimating the downlink bandwidth. When the bandwidth changes to a direction (e.g., becomes lower) significantly, the client selects a different video representation to match the newly estimated bandwidth, and go to step 3.

2.4. Extended Dependent Random Access Point (EDRAP) Pictures Based Video Coding and Streaming Signalling of EDRAP pictures using an supplemental enhancement information (SEI) message was proposed in proposal in JVET-U0084 and was adopted into the VSEI specification at the 21st JVET meeting in January 2021. At the 133rd MPEG meeting in January 2021, the EDRAP sample group was agreed based on the proposal in the MPEG input document m56020. For support of EDRAP based video streaming, at the 134th MPEG meeting in April 2021, the MPEG input document m56675 proposed an external stream track (EST) design for the ISOBMFF. The MPEG input document m57430 proposed an external stream representation (ESR) design for DASH.

Figure 4:
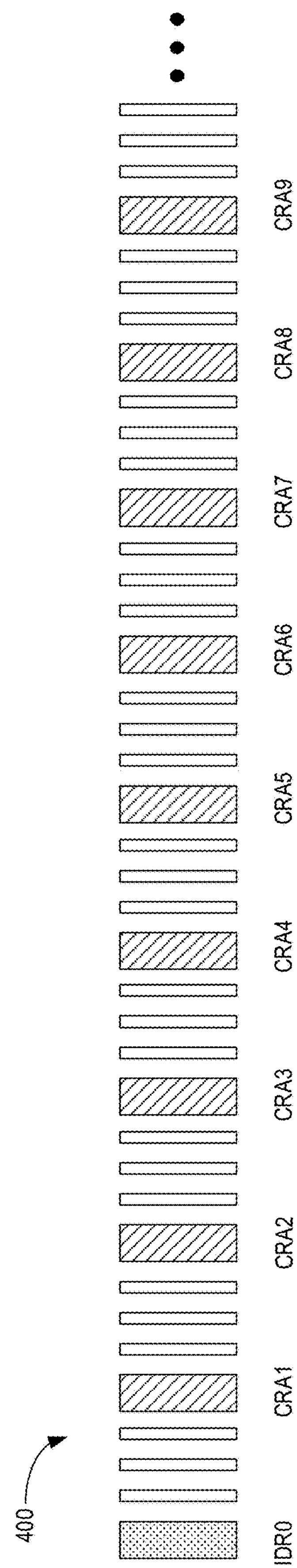
FIGS. 4 and 5 illustrate the concept of random access points (RAPs)
Figure 5:
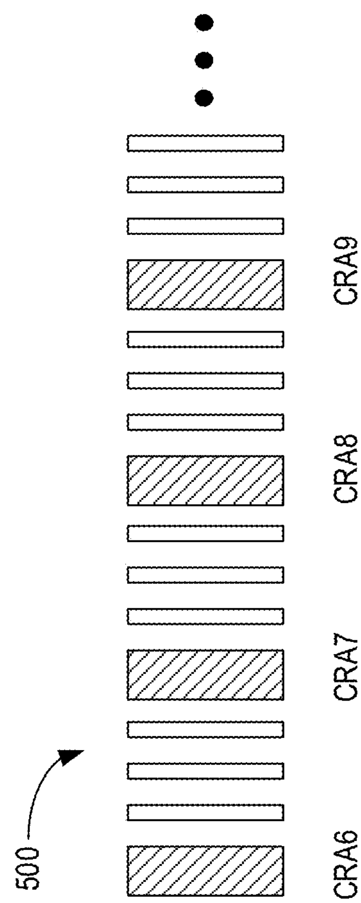

FIGS. 4 and 5 illustrate the existing concept of random access points (RAPs). The application (e.g., adaptive streaming) determines the frequency of random access points (RAPs), e.g., RAP period 1s or 2s. Conventionally RAPs are provided by coding of IRAP pictures, as shown in FIG. 4. Note that inter prediction references for the non-key pictures between RAP pictures are not shown, and from left to right is the output order. When random accessing from CRA6, the decoder receives and correctly decodes the pictures as shown in FIG. 5.

Figure 6:
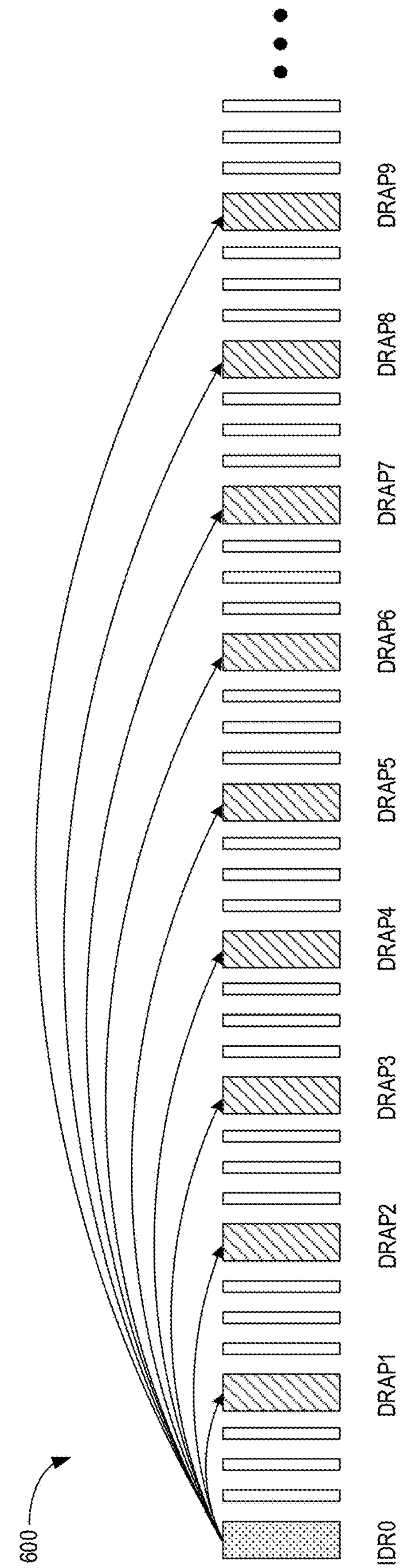
FIGS. 6 and 7 illustrate the concept of dependent random access points (DRAPs)
Figure 7:
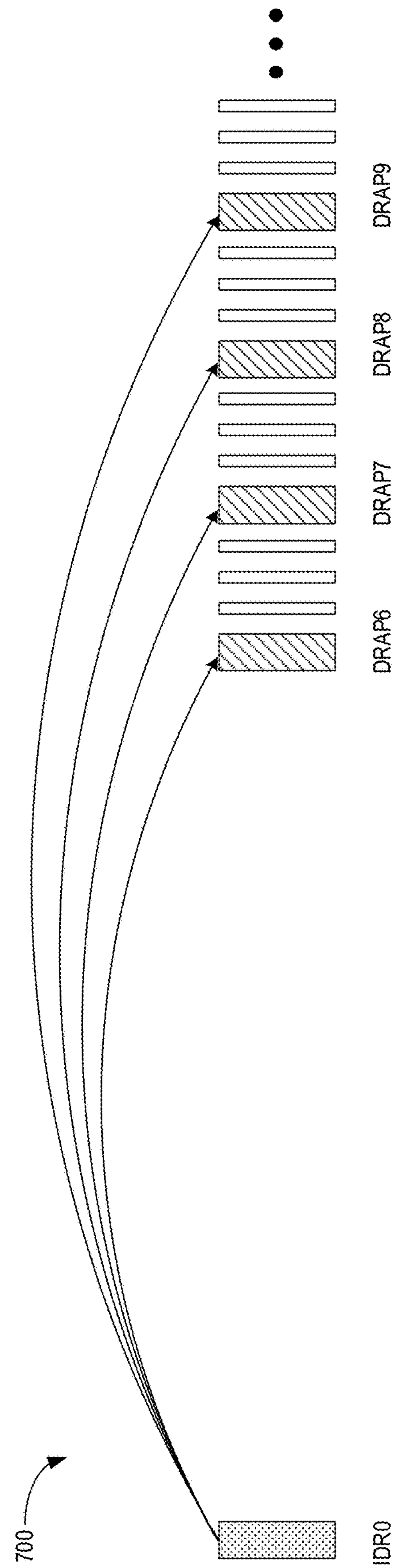

FIGS. 6 and 7 illustrate the concept of dependent random access points (DRAPs). The DRAP approach provides improved coding efficiency by allowing a DRAP picture (and subsequent pictures) to refer to the previous IRAP picture for inter prediction, as shown in FIG. 6. Note that inter prediction for the non-key pictures between RAP pictures are not shown, and from left to right is the output order. When random accessing from DRAP6, the decoder receives and correctly decodes the pictures as shown in FIG. 7.

Figure 8:
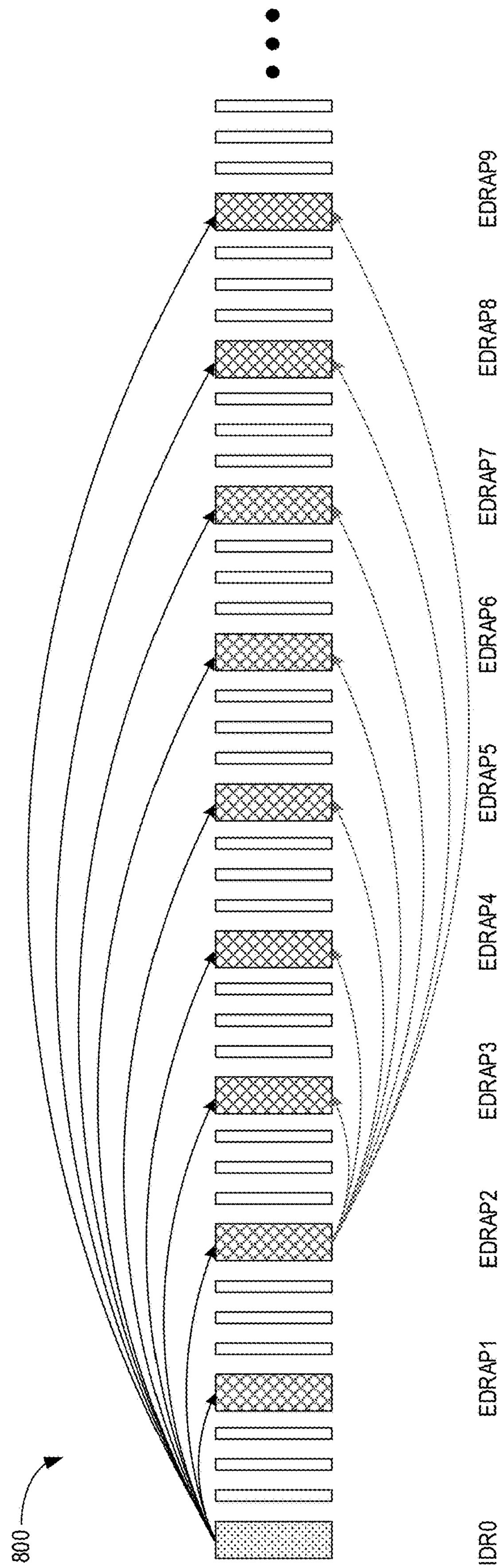
FIGS. 8 and 9 illustrate the concept of extended dependent random access points (EDRAPs)
Figure 9:
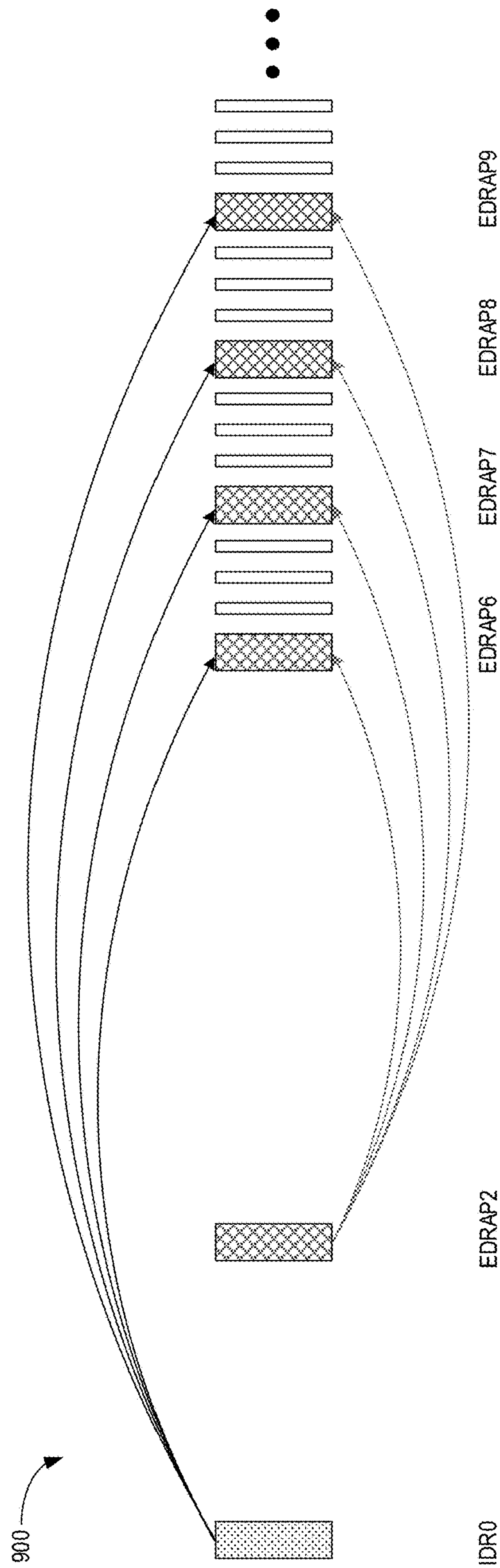

FIGS. 8 and 9 illustrate the concept of extended dependent random access points (EDRAPs). The EDRAP approach provides a bit more flexibility by allowing an EDRAP picture (and subsequent pictures) to refer to a few of the earlier RAP pictures (IRAP or EDRAP), e.g., as shown in FIG. 8. Note that inter prediction for the non-key pictures between RAP pictures are not shown, and from left to right is the output order. When random accessing from EDRAP6, the decoder receives and correctly decodes the pictures as shown in FIG. 9.

Figure 10:
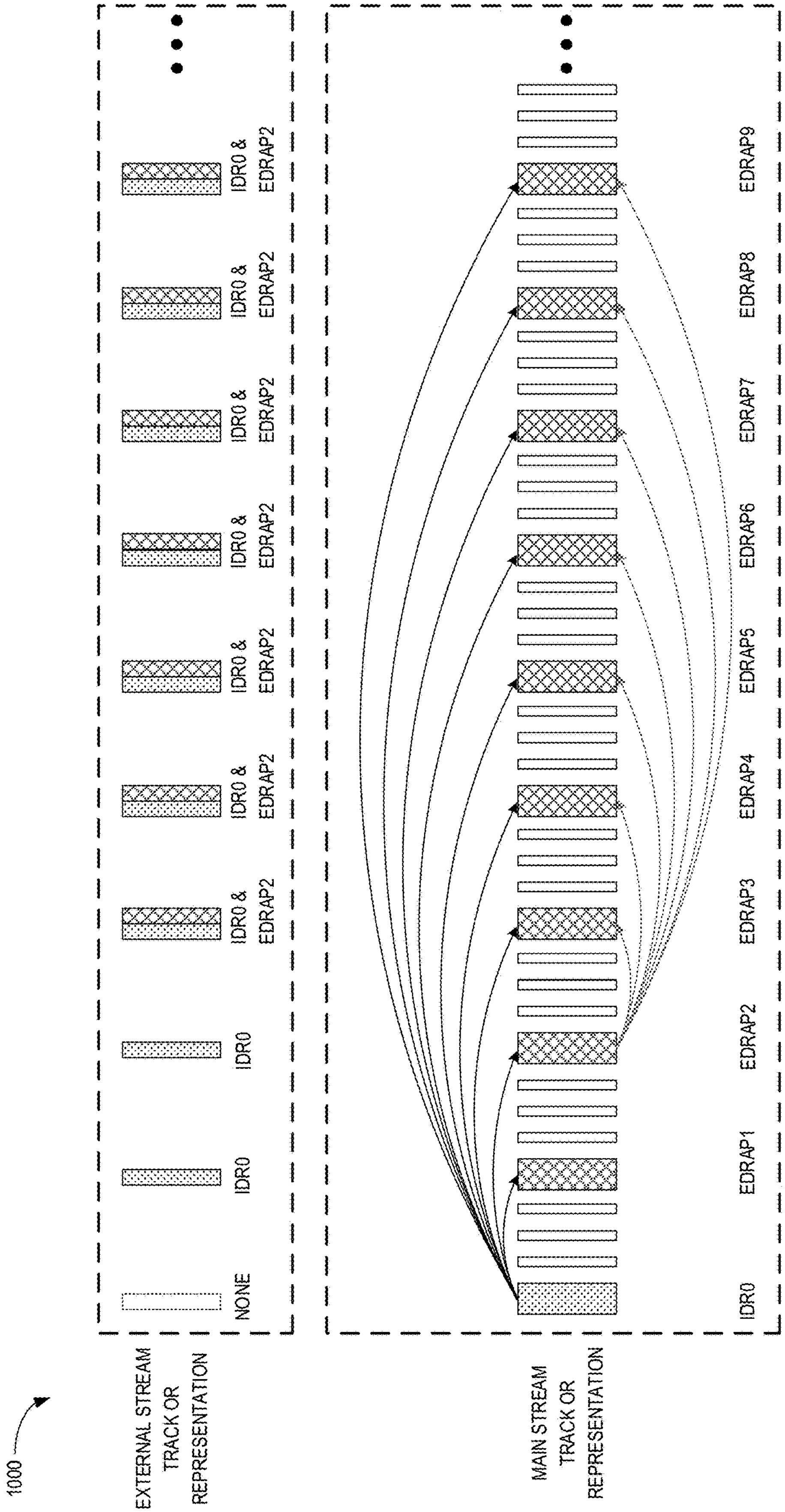
FIGS. 10 and 11 illustrate EDRAP based video streaming.
Figure 11:
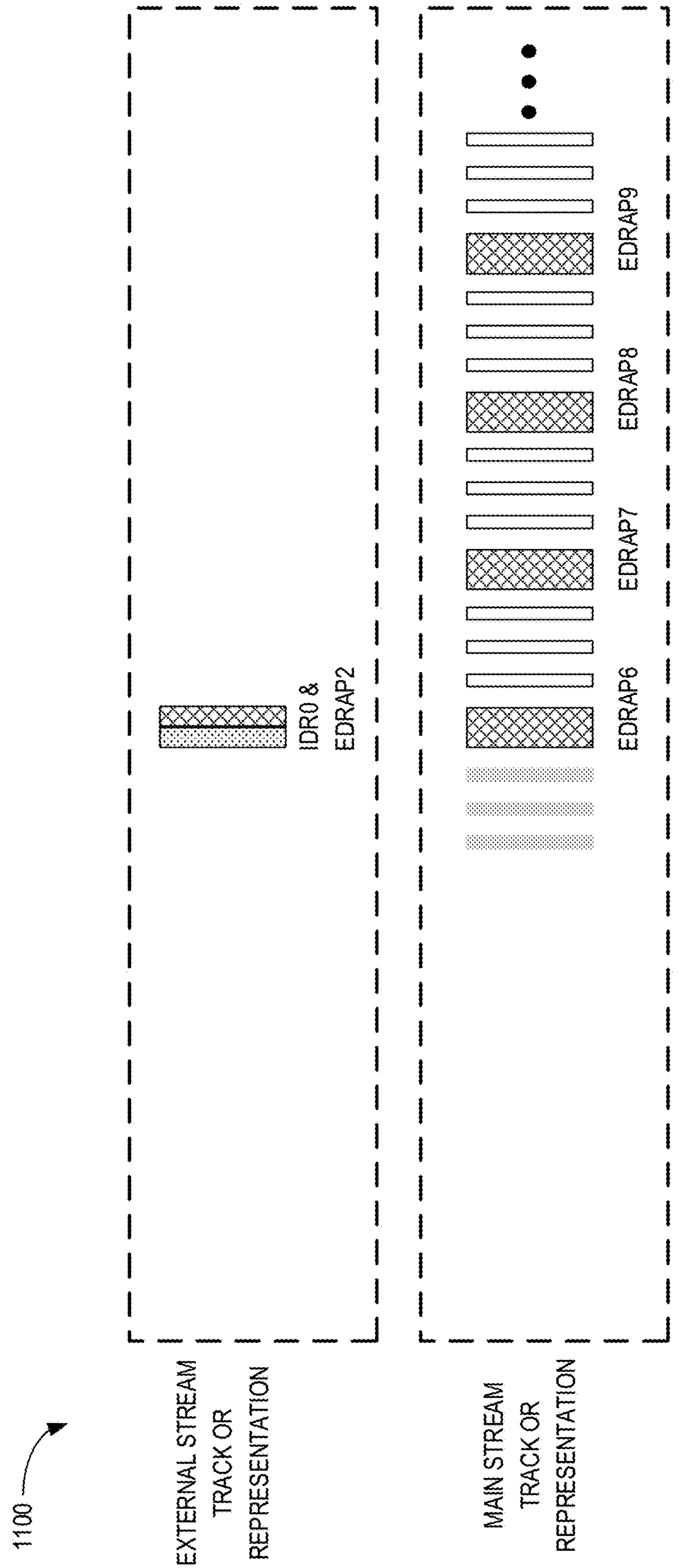

FIGS. 10 and 11 illustrate EDRAP based video streaming. When random accessing from or switching to the segment starting at EDRAP6, the decoder receives and decodes the segments as shown in FIG. 11.

The ESR design proposed in the MPEG input document m57430 is as follows:

2.1.1 Summary

An External Stream Representation (ESR) is time-synchronized with an associated Main Stream Representation (MSR), the "normal" Representation. An ESR contains only the random access point (RAP) pictures additionally needed when random accessing from an time-synced extended dependent random access point (EDRAP) picture/sample in the MSR.

The design is summarized as follows:

1) Five definitions, for the terms EDRAP picture, external elementary stream, external picture, External Stream Representation (ESR), and Main Stream Representation (MSR), are proposed.
2) An optional Adaptation Set level attribute, named @esasFlag, is proposed to indicate whether the Representations in the Adaptation Set are ESRs or MSRs.
3) As part of the semantics of the @esasFlag attribute, the following are proposed:
   a. The association of an ESR to an MSR through existing Representation attributes @associationId and @associationType, based a newly specified association type value 'aest' ("associated external stream track"; the same 4CC as the ISOBMFF track reference type).
   b. A new EssentialProperty descriptor is proposed to be included in Adaptation Sets containing ESRs, to indicate that a Representation in such an Adaptation Set cannot be consumed or played back by itself without other video Representations.
   c. Some constraints for simplifying the EDRAP based streaming operations:
      i. Each EDRAP picture in an MSR shall be the first picture in a Segment.
      ii. For an MSR and an ESR associated with each other, the following constraints apply:
         1. For each Segment in the MSR that starts with an EDRAP picture, there shall be a Segment in the ESR having the same Segment start time derived from the MPD as the Segment in the MSR, wherein the Segment in the ESR carries the external pictures needed for decoding of that EDRAP picture and the subsequent pictures in decoding order in the bitstream carried in the MSR.
         2. For each Segment in the MSR that does not start with an EDRAP picture, there shall be no Segment in the ESR having the same Segment start time derived from the MPD as the Segment in the MSR.

2.1.2 Definitions extended dependent random access point (EDRAP) picture picture in a sample that is a member of an EDRAP or DRAP sample group in an ISOBMFF track external elementary stream elementary stream containing access units with external pictures external picture picture that is in the external elementary stream in an ESR and is needed for inter prediction reference in decoding of the elementary stream in the MSR when random accessing from certain EDRAP pictures in the MSR External Stream Representation (ESR)

Representation containing an external elementary stream

Main Stream Representation (MSR)

Representation containing a video elementary stream 2.1.3 Semantics of AdaptationSet Element

TABLE 1

Semantics of AdaptationSet element

| Element or Attribute Name | Use | Description |
|---|---|---|
| AdaptationSet | | Adaptation Set description |
| ... | | |
| @subsegmentStartsWithSAP | OD default: 0 | when greater than 0, specifies that each Subsegment with SAP_type greater than 0 starts with a SAP of type less than or equal to the value of @subsegmentStartsWithSAP. A Subsegment starts with SAP when the Subsegment contains a SAP, and for the first SAP, $I_{SAU}$ is the index of the first access unit that |

TABLE 1-continued

| Semantics of AdaptationSet element | | |
|---|---|---|
| Element or Attribute Name | Use | Description |
| | | follows $I_{SAP}$, and $I_{SAP}$ is contained in the Subsegment. The semantics of @subsegmentStartsWithSAP equal to 0 are unspecified. |
| @esasFlag | OD default: false | when set to 'false', this specifies that all Representations in the Adaptation Set are Main Stream Representations (MSRs). The value set to 'true' specifies that all Representations in the Adaptation Sets are External Stream Representations (ESRs).<br>When not present, the value of this attribute is inferred to be equal to 'false'.<br>When the value of this attribute is equal to 'true' for an Adaptation Set ( i.e., all Representations in this Adaptation Set are ESRs), each Representation in this Adaptation Set shall be associated with an MSR through the Representation attributes @associationId and @associationType in the MSR, i.e., the @id of each Representation in this Adaptation Set shall be referred to by a value contained in the attribute @associationId corresponding to value in the attribute @associationType equal to 'aest', where @associationId and @associationType are Representation attributes of an MSR.<br>When the value of this attribute is equal to 'true' for an Adaptation Set, the Adaptation Set shall have an EssentialProperty descriptor with a @schemeIdUri of urn:mpeg:dash:adaptation-set-external-stream:2021; the presence of this EssentialProperty indicates that a Representation in the Adaptation Set shall not be consumed or played back by itself without other video Representations.<br>When the value of this attribute is equal to 'false' for an Adaptation Set ( i.e., all Representations in this Adaptation Set are MSRs), each EDRAP picture in any Representation in this Adaptation Set shall be the first picture in a Segment.<br>For an MSR and an ESR associated with each other through the Representation attributes @associationId and @associationType in the MSR, the following constraints apply:<br>- For each Segment in the MSR that starts with an EDRAP picture, there shall be a Segment in the ESR having the same Segment start time derived from the MPD as the Segment in the MSR, wherein the Segment in the ESR carries the external pictures needed for decoding of that EDRAP picture and the subsequent pictures in decoding order in the bitstream carried in the MSR.<br>- For each Segment in the MSR that does not start with an EDRAP picture, there shall be no Segment in the ESR having the same Segment start time derived from the MPD as the Segment in the MSR. |
| ... | | |

2.1.4 XML Syntax

```
<!-- Adaptation Set -->
<xs:complexType name="AdaptationSetType">
  <xs:complexContent>
    <xs:extension base="RepresentationBaseType">
      <xs:sequence>
        <xs:element name="Accessibility" type="DescriptorType" minOccurs="0"
maxOccurs="unbounded"/>
        <xs:element name="Role" type="DescriptorType" minOccurs="0"
maxOccurs="unbounded"/>
        <xs:element name="Rating" type="DescriptorType" minOccurs="0"
maxOccurs="unbounded"/>
        <xs:element name="Viewpoint" type="DescriptorType" minOccurs="0"
maxOccurs="unbounded"/>
        <xs:element name="ContentComponent" type="ContentComponentType" minOccurs="0"
maxOccurs="unbounded"/>
        <xs:element name="BaseURL" type="BaseURLType" minOccurs="0"
maxOccurs="unbounded"/>
```

-continued

```
            <xs:element name="SegmentBase" type="SegmentBaseType" minOccurs="0"/>
            <xs:element name="SegmentList" type="SegmentListType" minOccurs="0"/>
            <xs:element name="SegmentTemplate" type="SegmentTemplateType" minOccurs="0"/>
            <xs:element name="Representation" type="RepresentationType" minOccurs="0"
maxOccurs="unbounded"/>
         </xs:sequence>
         <xs:attribute ref="xlink:href"/>
         <xs:attribute ref="xlink:actuate" default="onRequest"/>
         <xs:attribute name="id" type="xs:unsignedInt"/>
         <xs:attribute name="group" type="xs:unsignedInt"/>
         <xs:attribute name="lang" type="xs:language"/>
         <xs:attribute name="contentType" type="IETF RFC6838ContentTypeType"/>
         <xs:attribute name="par" type="RatioType"/>
         <xs:attribute name="minBandwidth" type="xs:unsignedInt"/>
         <xs:attribute name="maxBandwidth" type="xs:unsignedInt"/>
         <xs:attribute name="minWidth" type="xs:unsignedInt"/>
         <xs:attribute name="maxWidth" type="xs:unsignedInt"/>
         <xs:attribute name="minHeight" type="xs:unsignedInt"/>
         <xs:attribute name="maxHeight" type="xs:unsignedInt"/>
         <xs:attribute name="minFrameRate" type="FrameRateType"/>
         <xs:attribute name="maxFrameRate" type="FrameRateType"/>
         <xs:attribute name="segmentAlignment" type="xs:boolean" default="false"/>
         <xs:attribute name="subsegmentAlignment" type="xs:boolean" default="false"/>
         <xs:attribute name="subsegmentStartsWithSAP" type="SAPType" default="0"/>
         <xs:attribute name="bitstreamSwitching" type="xs:boolean"/>
         <xs:attribute name="esasFlag" type="xs:boolean" default="false"/>
      </xs:extension>
   </xs:complexContent>
</xs:complexType>
<!-- Ratio Type for sar and par -->
<xs:simpleType name="RatioType">
   <xs:restriction base="xs:string">
      <xs:pattern value="[0-9]*:[0-9]*"/>
   </xs:restriction>
</xs:simpleType>
<!-- Type for Frame Rate -->
<xs:simpleType name="FrameRateType">
   <xs:restriction base="xs:string">
      <xs:pattern value="[0-9]*[0-9](/[0-9]*[0-9])?"/>
   </xs:restriction>
</xs:simpleType>
<!-- Type for IETF RFC6838 Content Type -->
<xs:simpleType name="IETF RFC6838ContentTypeType">
  <xs:restriction base="xs:string">
   <xs:enumeration value="text" />
   <xs:enumeration value="image" />
   <xs:enumeration value="audio" />
   <xs:enumeration value="video" />
   <xs:enumeration value="application" />
   <xs:enumeration value="font" />
  </xs:restriction>
</simpleType>
```

3. Problems

The design proposed in the MPEG input document m57430 has a problem described as follows. For a main streaming representation (MSR), none of the current definitions of the different Stream Access Point (SAP) types can be applied to an EDRAP based random access point, because external pictures from a different track or Representation are needed. This makes in impossible for signalling of whether segments start with SAPs and what types of SAPs.

4. Detailed Solutions

To solve the above-described problem, methods as summarized below are disclosed. The embodiments should be considered as examples to explain the general concepts and should not be interpreted in a narrow way. Furthermore, these embodiments can be applied individually or combined in any manner.

1) A Main Stream Representation (MSR) descriptor is specified to identify MSRs.
   a. In one example, the MSR descriptor is defined as an EssentialProperty descriptor with a particular value of @schemeIdUri, e.g., urn:mpeg:dash:msr:2021.
      i. In one example, the MSR descriptor is specified to be included in Adaptation Sets, i.e., to be Adaptation Set level. When included in an Adaptation Set, it indicates that all Representations in the Adapation Set are MSRs.
      ii. In one example, the MSR descriptor is specified to be included in Representations, i.e., to be Representation level. When included in a Representation, it indicates that the Representation is an MSR.
      iii. In one example, the MSR descriptor is specified to be included either in Adaptation Sets or in Representations, i.e., to be either Adaptation Set level or Representation level.
         1. When included in an Adaptation Set, it indicates that all Representations in the Adapation Set are MSRs.

a. Alternatively, when included in an Adaptation Set, it indicates that some or all of the Representations in the Adapation Set may be MSRs.

2. When included in a Representation, it indicates that the Representation is an MSR.

b. In one example, the MSR descriptor is defined as an SupplementalProperty descriptor with a particular value of @schemeIdUri, e.g., urn:mpeg:dash:msr:2021.

2) It is specified that, each Stream Access Point (SAP) in an MSR can be used for accessing the content in the Representation provided that the time-synced sample, when present in the track carried in the associated ESR, is made available to the client.

3) Optionally, it is specified that, each EDRAP picture in an MSR shall be the first picture in a Segment (i.e., each EDRAP picture shall start a Segment).

4) An External Stream Representation (ESR) descriptor is specified to identify ESRs.

a. In one example, the ESR descriptor is defined as an EssentialProperty descriptor with a particular value of @schemeIdUri, e.g., equal to urn:mpeg:dash:esr:2021.

i. In one example, the ESR descriptor is specified to be included in Adaptation Sets, i.e., to be Adaptation Set level. When included in an Adaptation Set, it indicates that all Representations in the Adapation Set are ESRs.

ii. In one example, the ESR descriptor is specified to be included in Representations, i.e., to be Representation level. When included in a Representation, it indicates that the Representation is an ESR.

iii. In one example, the ESR descriptor is specified to be included either in Adaptation Sets or in Representations, i.e., to be either Adaptation Set level or Representation level.

1. When included in an Adaptation Set, it indicates that all Representations in the Adapation Set are ESRs.

a. Alternatively, when included in an Adaptation Set, it indicates that some or all of the Representations in the Adapation Set may be ESRs.

2. When included in a Representation, it indicates that the Representation is an ESR.

b. In one example, the ESR descriptor is defined as an SupplementalProperty descriptor with @schemeIdUri, a particular value of e.g., urn:mpeg:dash:msr:2021.

5) It is specified that, each ESR shall be associated with an MSR through the (existing) Representation-level attributes @associationId and @associationType in the MSR as follows: the @id of the associated ESR shall be referred to by a value contained in the attribute @associationId for which the corresponding value in the attribute @associationType is equal to 'aest'.

5. Embodiments

Below are some example embodiments for all the solution items and some of their subitems summarized above in Section 4.

These embodiments can be applied to DASH. The changes are marked relative to the text of the design in clause 2.4. Most relevant parts that have been added or modified are underlined, and some of the deleted parts are ~~shown in strike through~~. There may be some other changes that are editorial in nature and thus not highlighted.

5.1.1 Definitions extended dependent random access point (EDRAP) picture picture in a sample that is a member of an EDRAP or DRAP sample group in an ISOBMFF track external elementary stream elementary stream containing access units with external pictures external picture picture that is in the external elementary stream in an ESR and is needed for inter prediction reference in decoding of the elementary stream in the MSR when random accessing from certain EDRAP pictures in the MSR External Stream Representation (ESR)

Representation containing an external elementary stream

Main Stream Representation (MSR)

Representation containing a video elementary stream

5.1.2 MSR and ESR Descriptors

An Adaptation Set may have an EssentialProperty descriptor with @schemeIdUri equal to urn:mpeg:dash:msr:2021. This descriptor is referred to as the MSR descriptor. The presence of this EssentialProperty indicates that each Representation in this Adaptation Set is an MSR.

The following applies for MSRs:

Each SAP in an MSR Representation in the Adaptation Set can be used for accessing the content in the Representation provided that the time-synced sample, when present in the track carried in the associated ESR, is made available to the client.

Each EDRAP picture in an MSR shall be the first picture in a Segment (i.e., each EDRAP picture shall start a Segment).

An Adaptation Set may have an EssentialProperty descriptor with @schemeIdUri equal to urn:mpeg:dash:esr:2021. This descriptor is referred to as the ESR descriptor. The presence of this EssentialProperty indicates that each Representation in this Adaptation Set is an ESR. An ESR shall not be consumed or played back by itself without other video Representations.

Each MSR shall be associated with an MSR through the (existing) Representation-level attributes @associationId and @associationType in the MSR as follows: the @id of the associated ESR shall be referred to by a value contained in the attribute @associationId for which the corresponding value in the attribute @associationType is equal to 'aest'.

Optionally, for an MSR and an ESR associated with each other through the Representation attributes @associationId and @associationType in the MSR, the following constraints apply:

For each Segment in the MSR that starts with an EDRAP picture, there shall be a Segment in the ESR having the same Segment start time derived from the MPD as the Segment in the MSR, wherein the Segment in the ESR carries the external pictures needed for decoding of that EDRAP picture and the subsequent pictures in decoding order in the bitstream carried in the MSR.

For each Segment in the MSR that does not start with an EDRAP picture, there shall be no Segment in the ESR having the same Segment start time derived from the MPD as the Segment in the MSR.

5.1.3 Semantics of AdaptationSet Element

TABLE 2

| Semantics of AdaptationSet element | | |
|---|---|---|
| Element or Attribute Name | Use | Description |
| AdaptationSet<br>... | | Adaptation Set description |
| @subsegmentStartsWithSAP | OD<br>default:<br>0 | when greater than 0, specifies that each Subsegment with SAP_type greater than 0 starts with a SAP of type less than or equal to the value of @subsegmentStartsWithSAP. A Subsegment starts with SAP when the Subsegment contains a SAP, and for the first SAP, $I_{SAU}$ is the index of the first access unit that follows $I_{SAP}$, and $I_{SAP}$ is contained in the Subsegment. The semantics of @subsegmentStartsWithSAP equal to 0 are unspecified. |
| ~~@esasFlag~~ | ~~OD~~<br>~~default:~~<br>~~false~~ | ~~when set to 'false', this specifies that all Representations in the Adaptation Set are Main Stream Representations (MSRs). The value set to 'true' specifies that all Representations Stream Representations (ESRs). in the Adaptation Sets are External~~<br>~~When not present, be equal to 'false'. the value of this attribute is inferred to~~<br>~~When the value of this attribute is equal to 'true' for an Adaptation Set ( i.e., all Representations in this Adaptation Set are ESRs), each Representation in this Adaptation Set shall be associated with an MSR through the Representation attributes @associationId and @associationType in the MSR, i.e. the @id of each Representation in this Adaptation Set shall be referred to by a value contained in the attribute @associationId corresponding to a value in the attribute @associationType @associationId equal to 'aest', where and @associationType are Representation attributes of an MSR.~~<br>~~When the value of this attribute is equal to 'true' for an Adaptation Set, the Adaptation Set shall have an **EssentialProperty** descriptor with @schemeIdUri equal to urn:mpeg:dash:adaptation-set-external-stream:2021; the presence of this **EssentialProperty** indicates that a Representation in the Adaptation Set shall not be consumed or video Representations. played back by itself without other~~<br>~~When the value of this attribute is equal to 'false' for an Adaptation Set ( i.e., all Representations in this Adaptation Set are MSRs), each EDRAP picture in any Representation in this Adaptation Set shall be the first picture in a Segment. For an MSR and an ESR associated with each other through the Representation attributes @associationId and @associationType constraints apply: in the MSR, the following~~<br>~~– For each Segment in the MSR that starts with an EDRAP picture, there shall be a Segment in the ESR having the same Segment start time derived from the MPD as the Segment in the MSR, wherein the Segment in the ESR carries the external pictures needed for decoding of that EDRAP picture and the subsequent pictures in decoding order in the bitstream carried in the MSR.~~<br>~~– For each Segment in the MSR that does not start with an EDRAP picture, there shall be no Segment in the ESR having the same Segment start time derived in the MSR. from the MPD as the Segment~~ |
| ... | | |

5.1.4 XML Syntax

```
<!-- Adaptation Set -->
<xs:complexType name="AdaptationSetType">
  <xs:complexContent>
    <xs:extension base="RepresentationBaseType">
      <xs:sequence>
```

-continued

```
            <xs:element name="Accessibility" type="DescriptorType" minOccurs="0"
maxOccurs="unbounded"/>
            <xs:element name="Role" type="DescriptorType" minOccurs="0"
maxOccurs="unbounded"/>
            <xs:element name="Rating" type="DescriptorType" minOccurs="0"
maxOccurs="unbounded"/>
            <xs:element name="Viewpoint" type="DescriptorType" minOccurs="0"
maxOccurs="unbounded"/>
            <xs:element name="ContentComponent" type="ContentComponentType" minOccurs="0"
maxOccurs="unbounded"/>
            <xs:element name="BaseURL" type="BaseURLType" minOccurs="0"
maxOccurs="unbounded"/>
            <xs:element name="SegmentBase" type="SegmentBaseType" minOccurs="0"/>
            <xs:element name="SegmentList" type="SegmentListType" minOccurs="0"/>
            <xs:element name="SegmentTemplate" type="SegmentTemplateType" minOccurs="0"/>
            <xs:element name="Representation" type="RepresentationType" minOccurs="0"
maxOccurs="unbounded"/>
         </xs:sequence>
         <xs:attribute ref="xlink:href"/>
         <xs:attribute ref="xlink:actuate" default="onRequest"/>
         <xs:attribute name="id" type="xs:unsignedInt"/>
         <xs:attribute name="group" type="xs:unsigned Int"/>
         <xs:attribute name="lang" type="xs:language"/>
         <xs:attribute name="contentType" type="IETF RFC6838ContentTypeType"/>
         <xs:attribute name="par" type="RatioType"/>
         <xs:attribute name="minBandwidth" type="xs:unsignedInt"/>
         <xs:attribute name="maxBandwidth" type="xs:unsignedInt"/>
         <xs:attribute name="minWidth" type="xs:unsignedInt"/>
         <xs:attribute name="maxWidth" type="xs:unsignedInt"/>
         <xs:attribute name="minHeight" type="xs:unsignedInt"/>
         <xs:attribute name="maxHeight" type="xs:unsignedInt"/>
         <xs:attribute name="minFrameRate" type="FrameRateType"/>
         <xs:attribute name="maxFrameRate" type="FrameRateType"/>
         <xs:attribute name="segmentAlignment" type="xs:boolean" default="false"/>
         <xs:attribute name="subsegmentAlignment" type="xs:boolean" default="false"/>
         <xs:attribute name="subsegmentStartsWithSAP" type="SAPType" default="0"/>
         <xs:attribute name="bitstreamSwitching" type="xs:boolean"/>
         <xs:attribute name="essTag" type="xs:boolean" default="false"/>
      </xs:extension>
   </xs:complexContent>
</xs:complexType>
<!-- Ratio Type for sar and par -->
<xs:simpleType name="RatioType">
   <xs:restriction base="xs:string">
      <xs:pattern value="[0-9]*:[0-9]*"/>
   </xs:restriction>
</xs:simpleType>
<!-- Type for Frame Rate -->
<xs:simpleType name="FrameRateType">
   <xs:restriction base="xs:string">
      <xs:pattern value="[0-9]*[0-9](/[0-9]*[0-9])?"/>
   </xs:restriction>
</xs:simpleType>
<!-- Type for IETF RFC6838 Content Type -->
<xs:simpleType name="IETF RFC6838ContentTypeType">
  <xs:restriction base="xs:string">
   <xs:enumeration value="text" />
   <xs:enumeration value="image" />
   <xs:enumeration value="audio" />
   <xs:enumeration value="video" />
   <xs:enumeration value="application" />
   <xs:enumeration value="font" />
  </xs:restriction>
</simpleType>
```

The embodiments of the present disclosure are related to a main stream representation descriptor.

Figure 12:
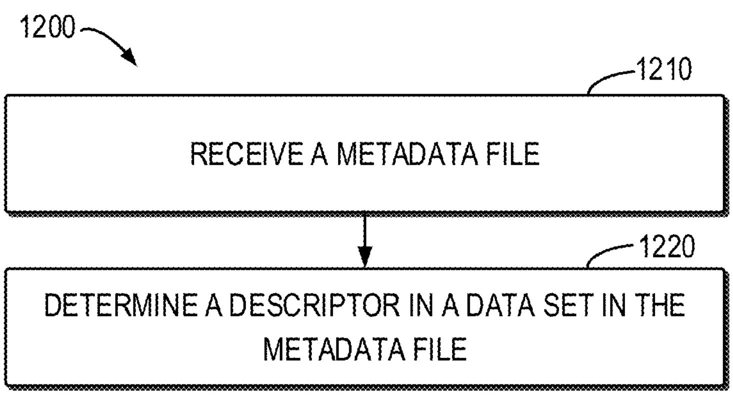
FIG. 12 illustrates a flowchart of a method for video processing in accordance with some embodiments of the present disclosure.

FIG. 12 illustrates a flowchart of a method 1200 for video processing in accordance with some embodiments of the present disclosure. The method 1200 may be implemented at a first device. For example, the method 1200 may be implanted at a client or a receiver. The term "client" used herein may refer to a piece of computer hardware or software that accesses a service made available by a server as part of the client-server model of computer networks. Only as an example, the client may be a smartphone or a tablet. In some embodiments, the first device may be implemented at the destination device 120 shown in FIG. 1.

At block 1210, the first device receives a metadata file from a second device. The metadata file may comprise important information about video bitstreams, e.g., the profile, tier, and level, and the like. For example, the metadata file may be a DASH media presentation description (MPD). It should be understood that the above examples are described merely for purpose of description. The scope of the present disclosure is not limited in this respect.

At block 1220, the first device determines a descriptor in a data set in the metadata file. A presence of the descriptor indicates that a representation in the data set is an external stream representation (ESR). In other words, if the data set comprises the descriptor, it means that a representation in the data set is an ESR.

According to the method 1200, a descriptor is employed to identify an ESR. Compared with the conventional solution where an attribute is utilized to identify an ESR, the proposed method can advantageously identify the ESR more efficiently.

In some embodiments, the descriptor may be defined as a data structure with an attribute equal to a uniform resource name (URN) string. In one example, the metadata file may be a media presentation description (MPD), and the data structure may be EssentialProperty in the MPD. Moreover, the attribute may be a schemeIdUri attribute, and the URN string may be "urn:mpeg:dash:esr:2022". That is, the descriptor may be defined as an EssentialProperty descriptor with a value of @schemeIdUri equal to a specific URN string, e.g., "urn:mpeg:dash:esr:2022". It should be understood that the possible implementation of the URN string described here may be merely illustrative and therefore should not be construed as limiting the present disclosure in any way.

In another example, the metadata file may be an MPD, and the data structure may be SupplementalProperty in the MPD. Likewise, the attribute may be a schemeIdUri attribute, and the URN string may be "urn:mpeg:dash:esr:2022". That is, the descriptor may be defined as an SupplementalProperty descriptor with a value of @schemeIdUri equal to a specific URN string, e.g., "urn:mpeg:dash:esr:2022". It should be understood that the possible implementation of the URN string described here may be merely illustrative and therefore should not be construed as limiting the present disclosure in any way.

In some embodiments, the data set may be an adaptation set. In this case, all of representations in the adaptation set may be ESRs. Alternatively, some of representations in the adaptation set may be ESRs.

In some embodiments, the data set may be a representation. In this case, the representation may be an ESR.

In some embodiments, the ESR may be associated with a main stream representation (MSR) through a set of representation-level attributes in the MSR. For example, the set of representation-level attributes may comprise an associationId attribute and an associationType attribute. By way of example, an id attribute of the ESR may be referred to by a value contained in the associationId attribute for which a value in the associationType attribute is equal to "aest". In other words, an ESR may be associated with an MSR through the representation-level attributes @associationId and @associationType in the MSR as follows: the @id of the associated ESR shall be referred to by a value contained in the attribute @associationId for which the corresponding value in the attribute @associationType is equal to "aest". Thereby, an ESR may be associated with the corresponding MSR, which facilitates the implementation of EDRAP based video streaming.

Figure 13:
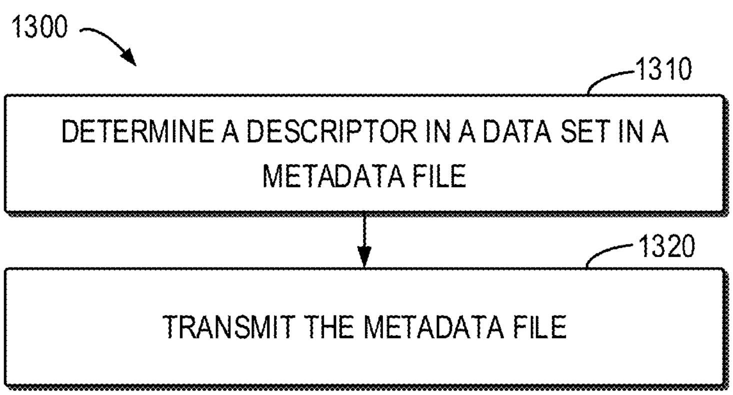
FIG. 13 illustrates a flowchart of a method for video processing in accordance with some embodiments of the present disclosure.

FIG. 13 illustrates a flowchart of a method 1300 for video processing in accordance with some embodiments of the present disclosure. The method 1300 may be implemented at a second device. For example, the method 1300 may be implanted at a server or a sender. The term "server" used herein may refer to a device capable of computing, in which case the client accesses the service by way of a network. The server may be a physical computing device or a virtual computing device. In some embodiments, the second device may be implemented at the source device 110 shown in FIG. 1.

At block 1310, the second device determines a descriptor in a data set in a metadata file. The metadata file may comprise important information about video bitstreams, e.g., the profile, tier, and level, and the like. For example, the metadata file may be a DASH media presentation description (MPD). A presence of the descriptor indicates that a representation in the data set may be an ESR. In other words, if the data set comprises the descriptor, it means that a representation in the data set is an ESR.

At block 1320, the second device transmits the metadata file to the first device.

According to the method 1300, a descriptor is employed to identify an ESR. Compared with the conventional solution where an attribute is utilized to identify an ESR, the proposed method can advantageously identify the ESR more efficiently.

In some embodiments, the descriptor may be defined as a data structure with an attribute equal to a uniform resource name (URN) string. In one example, the metadata file may be a media presentation description (MPD), and the data structure may be EssentialProperty in the MPD. Moreover, the attribute may be a schemeIdUri attribute, and the URN string may be "urn:mpeg:dash:esr:2022". That is, the descriptor may be defined as an EssentialProperty descriptor with a value of @schemeIdUri equal to a specific URN string, e.g., "urn:mpeg:dash:esr:2022". It should be understood that the possible implementation of the URN string described here may be merely illustrative and therefore should not be construed as limiting the present disclosure in any way.

In another example, the metadata file may be an MPD, and the data structure may be SupplementalProperty in the MPD. Likewise, the attribute may be a schemeIdUri attribute, and the URN string may be "urn:mpeg:dash:esr:2022". That is, the descriptor may be defined as an SupplementalProperty descriptor with a value of @schemeIdUri equal to a specific URN string, e.g., "urn:mpeg:dash:esr:2022". It should be understood that the possible implementation of the URN string described here may be merely illustrative and therefore should not be construed as limiting the present disclosure in any way.

In some embodiments, the data set may be an adaptation set. In this case, all of representations in the adaptation set may be ESRs. Alternatively, some of representations in the adaptation set may be ESRs.

In some embodiments, the data set may be a representation. In this case, the representation may be an ESR.

In some embodiments, the ESR may be associated with a main stream representation (MSR) through a set of representation-level attributes in the MSR. For example, the set of representation-level attributes may comprise an associationId attribute and an associationType attribute. By way of example, an id attribute of the ESR may be referred to by a value contained in the associationId attribute for which a value in the associationType attribute is equal to "aest". In other words, an ESR may be associated with an MSR through the representation-level attributes @associationId and @associationType in the MSR as follows: the @id of the associated ESR shall be referred to by a value contained in the attribute @associationId for which the corresponding value in the attribute @associationType is equal to "aest". Thereby, an ESR may be associated with the corresponding MSR, which facilitates the implementation of EDRAP based video streaming.

Embodiments of the present disclosure can be implemented separately. Alternatively, embodiments of the present disclosure can be implemented in any proper combinations. Implementations of the present disclosure can be described in view of the following clauses, the features of which can be combined in any reasonable manner.

Clause 1. A method for video processing, comprising: receiving, at a first device, a metadata file from a second device; and determining a descriptor in a data set in the metadata file, a presence of the descriptor indicating that a representation in the data set is an external stream representation (ESR).

Clause 2. A method for video processing, comprising: determining, at a second device, a descriptor in a data set in a metadata file, a presence of the descriptor indicating that a representation in the data set is an ESR; and transmitting the metadata file to a first device.

Clause 3. The method of any of clauses 1-2, wherein the descriptor is defined as a data structure with an attribute equal to a uniform resource name (URN) string.

Clause 4. The method of clause 3, wherein the metadata file is a media presentation description (MPD), and the data structure is EssentialProperty in the MPD.

Clause 5. The method of clause 3, wherein the metadata file is a media presentation description (MPD), and the data structure is SupplementalProperty in the MPD.

Clause 6. The method of any of clauses 4-5, wherein the attribute is a schemeIdUri attribute, and the URN string is "urn:mpeg:dash:esr:2022".

Clause 7. The method of any of clauses 1-6, wherein the data set is an adaptation set or a representation.

Clause 8. The method of any of clause 1-6, wherein the data set is an adaptation set, and all of or some of representations in the adaptation set are ESRs.

Clause 9. The method of any of clauses 1-8, wherein the ESR is associated with a main stream representation (MSR) through a set of representation-level attributes in the MSR.

Clause 10. The method of clause 9, wherein the set of representation-level attributes comprise an associationId attribute and an associationType attribute.

Clause 11. The method of clause 10, wherein an id attribute of the ESR is referred to by a value contained in the associationId attribute for which a value in the associationType attribute is equal to "aest".

Clause 12. An apparatus for processing video data comprising a processor and a non-transitory memory with instructions thereon, wherein the instructions upon execution by the processor, cause the processor to perform a method in accordance with any of Clauses 1-11.

Clause 13. A non-transitory computer-readable storage medium storing instructions that cause a processor to perform a method in accordance with any of Clauses 1-11.

Example Device

Figure 14:
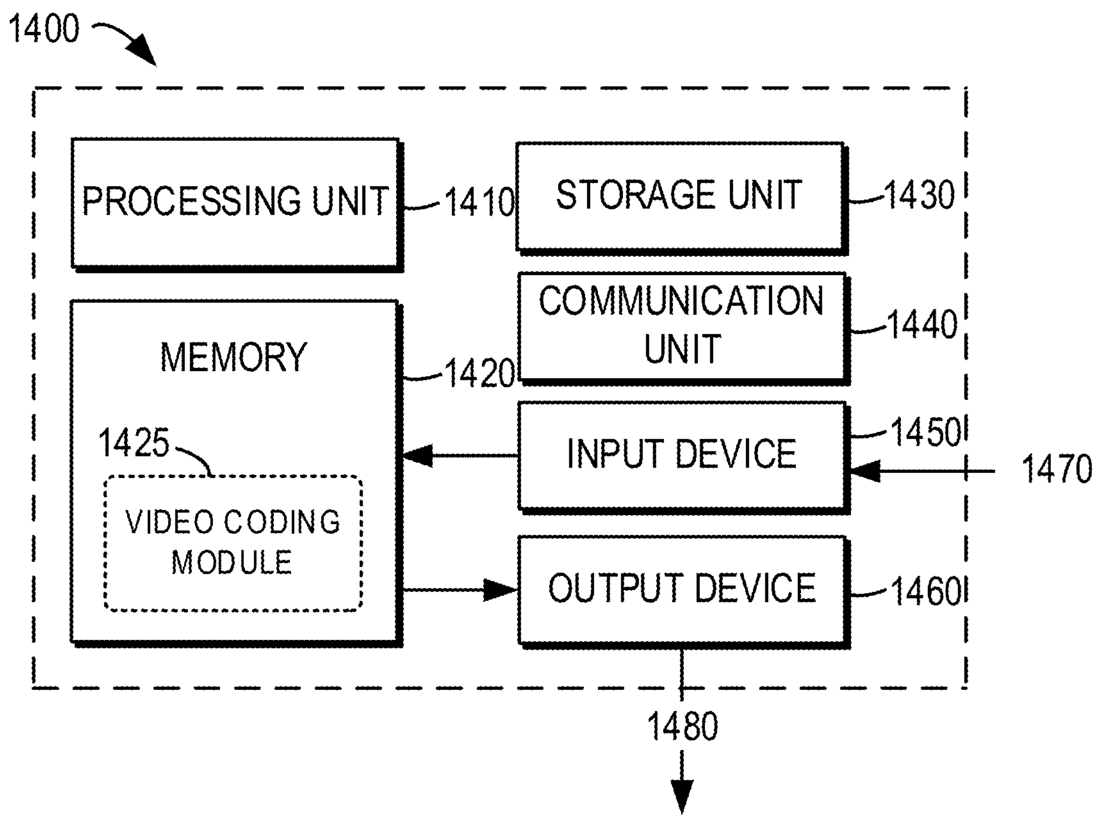
FIG. 14 illustrates a block diagram of a computing device in which various embodiments of the present disclosure can be implemented.

FIG. 14 illustrates a block diagram of a computing device 1400 in which various embodiments of the present disclosure can be implemented. The computing device 1400 may be implemented as or included in the source device 110 (or the video encoder 114 or 200) or the destination device 120 (or the video decoder 124 or 300).

It would be appreciated that the computing device 1400 shown in FIG. 14 is merely for purpose of illustration, without suggesting any limitation to the functions and scopes of the embodiments of the present disclosure in any manner.

As shown in FIG. 14, the computing device 1400 includes a general-purpose computing device 1400. The computing device 1400 may at least comprise one or more processors or processing units 1410, a memory 1420, a storage unit 1430, one or more communication units 1440, one or more input devices 1450, and one or more output devices 1460.

In some embodiments, the computing device 1400 may be implemented as any user terminal or server terminal having the computing capability. The server terminal may be a server, a large-scale computing device or the like that is provided by a service provider. The user terminal may for example be any type of mobile terminal, fixed terminal, or portable terminal, including a mobile phone, station, unit, device, multimedia computer, multimedia tablet, Internet node, communicator, desktop computer, laptop computer, notebook computer, netbook computer, tablet computer, personal communication system (PCS) device, personal navigation device, personal digital assistant (PDA), audio/video player, digital camera/video camera, positioning device, television receiver, radio broadcast receiver, E-book device, gaming device, or any combination thereof, including the accessories and peripherals of these devices, or any combination thereof. It would be contemplated that the computing device 1400 can support any type of interface to a user (such as "wearable" circuitry and the like).

The processing unit 1410 may be a physical or virtual processor and can implement various processes based on programs stored in the memory 1420. In a multi-processor system, multiple processing units execute computer executable instructions in parallel so as to improve the parallel processing capability of the computing device 1400. The processing unit 1410 may also be referred to as a central processing unit (CPU), a microprocessor, a controller or a microcontroller.

The computing device 1400 typically includes various computer storage medium. Such medium can be any medium accessible by the computing device 1400, including, but not limited to, volatile and non-volatile medium, or detachable and non-detachable medium. The memory 1420 can be a volatile memory (for example, a register, cache, Random Access Memory (RAM)), a non-volatile memory (such as a Read-Only Memory (ROM), Electrically Erasable Programmable Read-Only Memory (EEPROM), or a flash memory), or any combination thereof. The storage unit 1430 may be any detachable or non-detachable medium and may include a machine-readable medium such as a memory, flash memory drive, magnetic disk or another other media, which can be used for storing information and/or data and can be accessed in the computing device 1400.

The computing device 1400 may further include additional detachable/non-detachable, volatile/non-volatile memory medium. Although not shown in FIG. 14, it is possible to provide a magnetic disk drive for reading from and/or writing into a detachable and non-volatile magnetic disk and an optical disk drive for reading from and/or writing into a detachable non-volatile optical disk. In such cases, each drive may be connected to a bus (not shown) via one or more data medium interfaces.

The communication unit 1440 communicates with a further computing device via the communication medium. In addition, the functions of the components in the computing device 1400 can be implemented by a single computing cluster or multiple computing machines that can communicate via communication connections. Therefore, the computing device 1400 can operate in a networked environment using a logical connection with one or more other servers, networked personal computers (PCs) or further general network nodes.

The input device 1450 may be one or more of a variety of input devices, such as a mouse, keyboard, tracking ball, voice-input device, and the like. The output device 1460 may be one or more of a variety of output devices, such as a display, loudspeaker, printer, and the like. By means of the communication unit 1440, the computing device 1400 can further communicate with one or more external devices (not shown) such as the storage devices and display device, with one or more devices enabling the user to interact with the computing device 1400, or any devices (such as a network card, a modem and the like) enabling the computing device 1400 to communicate with one or more other computing devices, if required. Such communication can be performed via input/output (I/O) interfaces (not shown).

In some embodiments, instead of being integrated in a single device, some or all components of the computing device 1400 may also be arranged in cloud computing architecture. In the cloud computing architecture, the components may be provided remotely and work together to implement the functionalities described in the present disclosure. In some embodiments, cloud computing provides computing, software, data access and storage service, which will not require end users to be aware of the physical locations or configurations of the systems or hardware providing these services. In various embodiments, the cloud computing provides the services via a wide area network (such as Internet) using suitable protocols. For example, a cloud computing provider provides applications over the wide area network, which can be accessed through a web browser or any other computing components. The software or components of the cloud computing architecture and corresponding data may be stored on a server at a remote position. The computing resources in the cloud computing environment may be merged or distributed at locations in a remote data center. Cloud computing infrastructures may provide the services through a shared data center, though they behave as a single access point for the users. Therefore, the cloud computing architectures may be used to provide the components and functionalities described herein from a service provider at a remote location. Alternatively, they may be provided from a conventional server or installed directly or otherwise on a client device.

The computing device 1400 may be used to implement video encoding/decoding in embodiments of the present disclosure. The memory 1420 may include one or more video coding modules 1425 having one or more program instructions. These modules are accessible and executable by the processing unit 1410 to perform the functionalities of the various embodiments described herein.

In the example embodiments of performing video encoding, the input device 1450 may receive video data as an input 1470 to be encoded. The video data may be processed, for example, by the video coding module 1425, to generate an encoded bitstream. The encoded bitstream may be provided via the output device 1460 as an output 1480.

In the example embodiments of performing video decoding, the input device 1450 may receive an encoded bitstream as the input 1470. The encoded bitstream may be processed, for example, by the video coding module 1425, to generate decoded video data. The decoded video data may be provided via the output device 1460 as the output 1480.

While this disclosure has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting.

I claim:

1. A method for media streaming, comprising:

receiving, at a first device, a metadata file from a second device; and determining whether an external stream representation (ESR) descriptor is present in a data set in the metadata file, a presence of the ESR descriptor indicating that a representation in the data set is an external stream representation (ESR), wherein the ESR is associated with a main stream representation (MSR) through a set of representation-level attributes in the MSR.

2. The method of claim 1, wherein the ESR descriptor is defined as a data structure with an attribute equal to a uniform resource name (URN) string.

3. The method of claim 2, wherein the metadata file is a media presentation description (MPD), and the data structure is EssentialProperty in the MPD.

4. The method of claim 3, wherein the attribute is a schemeldUri attribute, and the URN string is "urn:mpeg:dash:esr:2022".

5. The method of claim 1, wherein the data set is an adaptation set.

6. The method of claim 1, wherein the set of representation-level attributes comprise an associationId attribute and an associationType attribute.

7. The method of claim 6, wherein an id attribute of the ESR is referred to by a value contained in the associationId attribute for which a value in the association Type attribute is equal to "aest".

8. A method for media streaming, comprising:

determining, at a second device, whether to incorporate an ESR descriptor into a data set in a metadata file, a presence of the ESR descriptor indicating that a representation in the data set is an ESR, wherein the ESR is associated with a main stream representation (MSR) through a set of representation-level attributes in the MSR;

generating the metadata file based on the determining; and transmitting the metadata file to a first device.

9. The method of claim 8, wherein the ESR descriptor is defined as a data structure with an attribute equal to a uniform resource name (URN) string.

10. The method of claim 9, wherein the metadata file is a media presentation description (MPD), and the data structure is EssentialProperty in the MPD.

11. The method of claim 10, wherein the attribute is a schemeldUri attribute, and the URN string is "urn:mpeg:dash:esr:2022".

12. The method of claim 8, wherein the data set is an adaptation set.

13. The method of claim 8, wherein the set of representation-level attributes comprise an associationId attribute and an association Type attribute.

14. The method of claim 13, wherein an id attribute of the ESR is referred to by a value contained in the associationId attribute for which a value in the association Type attribute is equal to "aest".

15. An apparatus for media streaming comprising a processor and a non-transitory memory with instructions thereon, wherein the instructions upon execution by the processor, cause the processor to perform acts comprising:

receiving, at a first device, a metadata file from a second device; and determining whether an external stream representation (ESR) descriptor is present in a data set in the metadata file, a presence of the ESR descriptor indicating that a representation in the data set is an external stream representation (ESR), wherein the ESR is associated with a main stream representation (MSR) through a set of representation-level attributes in the MSR.

16. A non-transitory computer-readable storage medium storing instructions that cause a processor to perform acts comprising:

receiving, at a first device, a metadata file from a second device; and determining whether an external stream representation (ESR) descriptor is present in a data set in the metadata file, a presence of the ESR descriptor indicating that a representation in the data set is an external stream representation (ESR), wherein the ESR is associated with a main stream representation (MSR) through a set of representation-level attributes in the MSR.

17. An apparatus for media streaming comprising a processor and a non-transitory memory with instructions thereon, wherein the instructions upon execution by the processor, cause the processor to perform acts comprising:

determining, at a second device, whether to incorporate an ESR descriptor into a data set in a metadata file, a presence of the ESR descriptor indicating that a representation in the data set is an ESR, wherein the ESR is associated with a main stream representation (MSR) through a set of representation-level attributes in the MSR;

generating the metadata file based on the determining; and transmitting the metadata file to a first device.

18. A non-transitory computer-readable storage medium storing instructions that cause a processor to perform acts comprising:

determining, at a second device, whether to incorporate an ESR descriptor into a data set in a metadata file, a presence of the ESR descriptor indicating that a representation in the data set is an ESR, wherein the ESR is associated with a main stream representation (MSR) through a set of representation-level attributes in the MSR;

generating the metadata file based on the determining; and transmitting the metadata file to a first device.

* * * * *